(12) United States Patent (10) Patent No.: US 8,411,354 B2
Schill et al. (45) Date of Patent: Apr. 2, 2013

(54) CARRIER-ENVELOPE-PHASE STABILIZATION OF A MASTER OSCILLATOR OPTICAL AMPLIFIER SYSTEM

(75) Inventors: Alexander W. Schill, San Jose, CA (US); Chengquan Li, Sunnyvale, CA (US); Philippe Féru, Danville, CA (US)

(73) Assignee: Coherent, Inc., Santa Clara, CA (US)

( * ) Notice: Subject to any disclaimer, the term of this patent is extended or adjusted under 35 U.S.C. 154(b) by 82 days.

(21) Appl. No.: 13/204,429

(22) Filed: Aug. 5, 2011

(65) Prior Publication Data

US 2013/0034114 A1 Feb. 7, 2013

(51) Int. Cl.
*H01S 3/10* (2006.01)
(52) U.S. Cl. .................................... 359/346; 372/38.01
(58) Field of Classification Search .................. 359/346, 359/341.1; 372/29.01, 29.011, 29.023, 25, 372/38.01
See application file for complete search history.

(56) References Cited

U.S. PATENT DOCUMENTS

| | | | |
|---|---|---|---|
| 6,850,543 B2* | 2/2005 | Cundiff et al. | 372/18 |
| 7,428,096 B2 | 9/2008 | Nakazawa et al. | |
| 7,474,457 B2 | 1/2009 | Krausz et al. | |
| 7,701,982 B2* | 4/2010 | Yu et al. | 372/18 |
| 7,804,863 B2 | 9/2010 | Adel et al. | |
| 2003/0185255 A1* | 10/2003 | Ye et al. | 372/18 |
| 2004/0017833 A1* | 1/2004 | Cundiff et al. | 372/18 |
| 2007/0071060 A1 | 3/2007 | Holzwarth et al. | |
| 2010/0040097 A1* | 2/2010 | Verhoef | 372/25 |
| 2010/0061411 A1 | 3/2010 | Chang et al. | |
| 2010/0265972 A1* | 10/2010 | Hartl et al. | 372/18 |
| 2011/0019267 A1 | 1/2011 | Li | |
| 2011/0026105 A1 | 2/2011 | Bayramian et al. | |
| 2011/0080580 A1 | 4/2011 | Fermann et al. | |

FOREIGN PATENT DOCUMENTS

WO 2011/011275 A2 1/2011

OTHER PUBLICATIONS

Balčiūnas et al., "Carrier Envelope Phase Stabilization of a Yb:KGW Laser Amplifier", Optics Letters, vol. 36, No. 16, Aug. 15, 2011, pp. 3242-3244.
Li et al., "Carrier-Envelope Phase Stabilization by Controlling Compressor Grating Separation", Applied Physics Letters, vol. 92, 2008, pp. 191114-1-191114-3.
Li et al., "Single Shot Carrier Envelope Phase Stabilization of a 10 kHz, 10W Regenerative Amplifier", Springer Proceedings in Physics, vol. 125, 2012, pp. 9-13.
International Search Report and Written Opinion received for PCT Patent Application No. PCT/US2012/049134, mailed on Nov. 14, 2012, 13 pages.

(Continued)

*Primary Examiner* — Mark Hellner
*Assistant Examiner* — Ari M Diacou
(74) *Attorney, Agent, or Firm* — Morrison & Foerster LLP

(57) ABSTRACT

A laser and amplifier combination delivers a sequence of optical pulses at a predetermined pulse-repetition frequency PRF. An interferometer generates a signal representative of the carrier-envelope phase (CEP) of the pulses at intervals corresponding to the PRF. The signal includes frequency components from DC to the PRF. The signal is divided into high and low frequency ranges. The high and low frequency ranges are sent to independent high frequency and low frequency control electronics, which drive respectively a high-frequency CEP controller and a low frequency controller for stabilizing the CEP of pulses in the sequence.

18 Claims, 5 Drawing Sheets

OTHER PUBLICATIONS

Li et al., "Single-Shot Carrier Envelope Phase Stabilization of a 10 kHz, 10W Regenerative Amplifier System" Presentation during the 3rd International Conference on Attosecond Physics (ATTO3), Hokkaido University, Sapporo, Japan, Jul. 6-8, 2011, 2 pages.

Koke, et al., "Carrier-envelope phase stabilization of amplified pulses using an all-electronic servo loop", CThO1, OSA/CLEO/IQEC, 2009, 2 pages.

Kakehata, et al., "Carrier-envelope-phase stabilized chirped-pulse amplification system scalable to higher pulse energies", Optics Express, vol. 12, No. 10, 2004, pp. 2070-2080.

Baltuska, et al., "Attosecond control of electronic processes by intense light fields", Nature, vol. 421, Feb. 6, 2003, pp. 611-615.

Li, et al., "Carrier-envelope phase shift caused by variation of grating separation", Optics Letters, vol. 31, No. 21, Nov. 1, 2006, pp. 3113-3115.

Koke, et al., "Fast f-to-2f interferometer for a direct measurement of the carrier-envelope phase drift of ultrashort amplified laser pulses", Optics Letters, vol. 33, No. 21, Nov. 1, 2008, pp. 2545-2547.

* cited by examiner

CARRIER-ENVELOPE-PHASE STABILIZATION OF A MASTER OSCILLATOR OPTICAL AMPLIFIER SYSTEM

TECHNICAL FIELD OF THE INVENTION

The present invention relates in general to laser oscillator-plus-amplifier arrangements for delivering femtosecond pulses. The invention relates in particular to such arrangements wherein a laser pulse is temporally stretched prior to amplification and the amplified pulse is temporally compressed before delivery.

DISCUSSION OF BACKGROUND ART

Optical pulses having a duration of a few femtoseconds or less may include only a few optical cycles at a fundamental carrier frequency of the pulse within an envelope of the pulse. A pulse-envelope typically has a Gaussian or Sech-squared form. The peak power within the envelope will depend on the phase of the carrier cycles relative to the envelope. This is referred to by practitioners of the art as the carrier envelope phase (CEP). FIG. 1A is a graph schematically illustrating a condition where the carrier is retarded in phase by an amount $\phi_{CE}$ with respect to the pulse envelope. The highest peak power will occur when a peak of one of the carrier cycles is exactly in phase ($\phi_{CE}=0.0$) with the peak of the envelope. This is schematically illustrated in FIG. 1B. The less the number of cycles within the envelope, i.e., the shorter the pulse, the greater is this phase dependence of peak power in the pulse.

Techniques for stabilizing the CEP of a laser oscillator have long been known in the art. One such technique involves a closed loop feedback arrangement wherein the CEP is measured and compared with a desired value. Any difference between the measured and actual value is used to vary optical-pump power to a gain medium of the oscillator to drive the measured value back to the desired value. It has been found, however, that if a pulse from a CEP-stabilized oscillator is amplified in a chirped pulse amplification arrangement the CEP of the amplified pulses will usually not be stable. In such an arrangement input pulses from the oscillator are temporally stretched by a pulse stretcher from an original duration before amplification; amplified in an optical amplifier; and temporally compressed in a pulse compressor back to about the original pulse duration.

One approach to stabilizing output pulses from a chirped pulse amplification arrangement is disclosed in U.S. Publication No. 2010/0061411, incorporated herein by reference. Here, stabilization is effected by a closed loop arrangement in which the CEP is again measured and compared with a desired value. Any difference between the measured and actual value is used to vary the separation of gratings in the pulse stretcher or compressor of the amplifier to drive the measured value back to the desired value.

A problem with this and other prior-art approaches to CEP control in a master-oscillator-plus-amplifier system is that the approaches do not take into account that different factors contribute to total CEP instability. By way of example there may be a slow CEP drift due to thermal effects and higher frequency drifts due to mechanical resonances within the pulse stretcher, the optical amplifier, or the pulse compressor.

U.S. Pat. No. 7,701,982, granted to Yu et al., discloses an arrangement for a stabilizing the CEP of a modelocked oscillator, optically pumped by a beam from a pump-laser. Here, a balanced homodyne detection system is used in an f-2f interferometer to generate a CEP error signal that is used to stabilize the CEP of an ultrafast oscillator. Two parts of the error signal (one from each arm of the balanced homodyne detector arrangement) are processed by a first PID (proportional-integral-differential) controller (feedback circuit). A feedback signal from the first PID controller is split into two portions. A first of the two portions is fed to a second PID controller. A signal from the second PID controller is used to adjust a slow (low-frequency) response actuator in the oscillator, in this case, a prism located in the oscillator between resonator (laser-cavity) mirrors of the oscillator, and moveable by a piezoelectric transducer (PZT) in response to the signal from the second PID controller. The second of the two portions of the signal from first PID controller is fed to a fast-response) actuator outside of the laser cavity, which responds primarily to high-frequency components of the signal from the first PID controller. In this case, the actuator is an acousto-optic modulator (AOM) inserted in the pump-laser beam to precisely modulate the pump power delivered to a gain-element in the oscillator laser-cavity. This methodology is described as being effective at stabilizing the CE phase of a mode-locked oscillator.

One shortcoming of the arrangement of the Yu et al. patent is that the signal controlling the low frequency actuator is not independent of the signal controlling the high frequency actuator. Any adjustment of the gain of the first PID controller automatically adjusts the net gain of the first and second PID controllers in series. Another shortcoming of the arrangement of the Yu et al. patent is that there is no provision for selecting the frequency bands applied to the high-frequency and low-frequency actuators. The particular actuators selected primarily determine whatever frequency selection there is. Yet another shortcoming of the arrangement of the Yu et al. patent is that low-frequency control requires a movable element in the oscillator laser cavity. Moving this element during operation could interfere with the mode-locking of the oscillator. A further shortcoming of the disclosure of the Yu et al. patent is that it does not address the problem of controlling the CEP of an oscillator-plus-amplifier system. This is significant inasmuch as most ultrafast laser systems in use are oscillator-plus-amplifier systems.

There remains a need for a method and apparatus for controlling the CEP of an ultrafast oscillator-plus-amplifier laser system. Such a method and apparatus should be capable of dealing with above-described, frequency-dependent CEP instability sources while overcoming the shortcomings of the Yu et al. arrangement for oscillator control.

SUMMARY OF THE INVENTION

In one aspect of an apparatus in accordance with the present invention comprises an oscillator arrangement including a laser cavity for generating modelocked optical pulses from which a sequence thereof, having a predetermined pulse-repetition frequency (PRF), is selected for amplification. An optical amplifier arrangement is provided for amplifying the sequence of optical pulses selected for amplification and delivering a corresponding sequence of amplified pulses. An arrangement for periodically generating, at a maximum frequency less than or equal to the PRF of the sequence of optical pulses, a first signal representative of the instant carrier-envelope phase (CEP) of the pulses in the sequence of amplified pulses. Electronic means are provided for dividing the first signal into second and third signals. The second signal includes frequency components in a first range between DC and a first frequency less than the maximum frequency, and the third signal includes frequency components in a second range between a second frequency less than the maximum frequency and the maximum frequency. A slow-response CEP-controller and a fast-response CEP-controller are provided for adjusting the CEP of the pulses in the sequence of amplified pulses. Each of the CEP-controllers is located outside of the laser cavity of the oscillator arrangement. A first signal processing device is arranged to receive the second signal, and a second signal processing device is arranged to receive the third signal. The first and second signal processing devices are arranged to generate respectively first and second control signals, each thereof representative of a difference between the instant and a desired CEP of the pulses in the sequence of amplified pulses. The first and second control signals adjust respectively the slow-response and fast-response CEP-controllers to minimize the difference between the instant and the desired CEP of the pulses in the sequence of amplified pulses.

DETAILED DESCRIPTION OF THE INVENTION

Figure 1A:
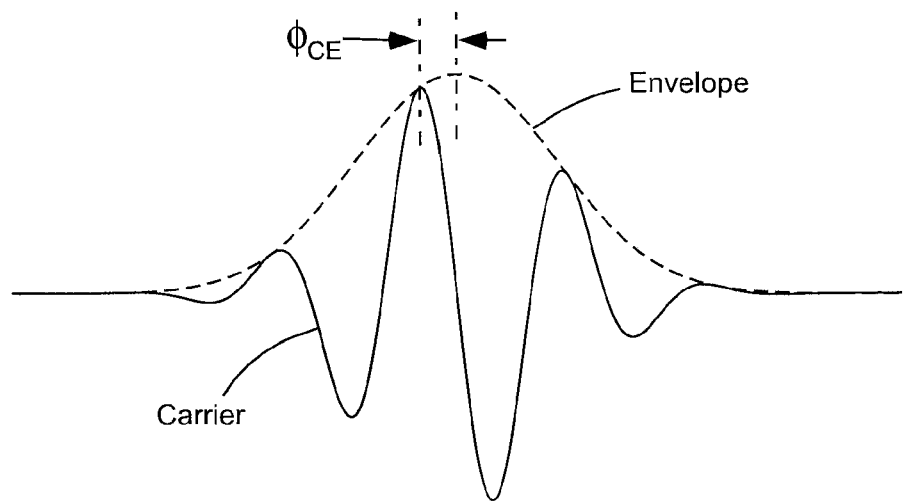
FIG. 1A is a graph schematically illustrating a carrier wave lagging a pulse envelope in phase by an amount ($\phi_{CE}$).
Figure 1B:
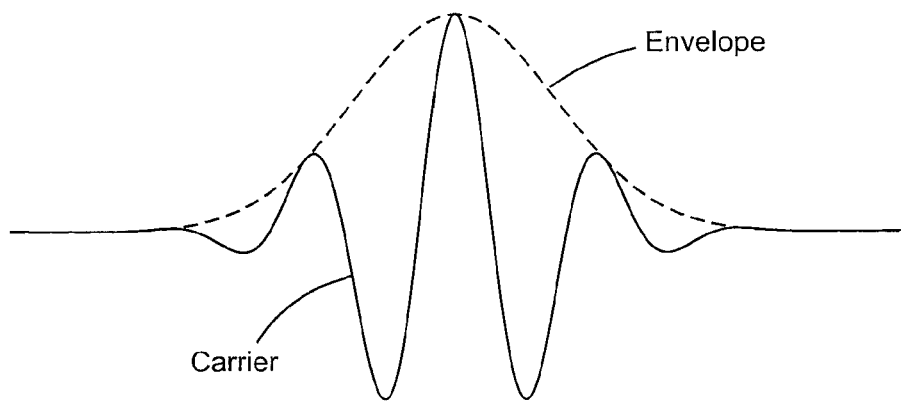
FIG. 1B is a graph schematically illustrating a carrier wave exactly in phase with a pulse envelope.
Figure 2:
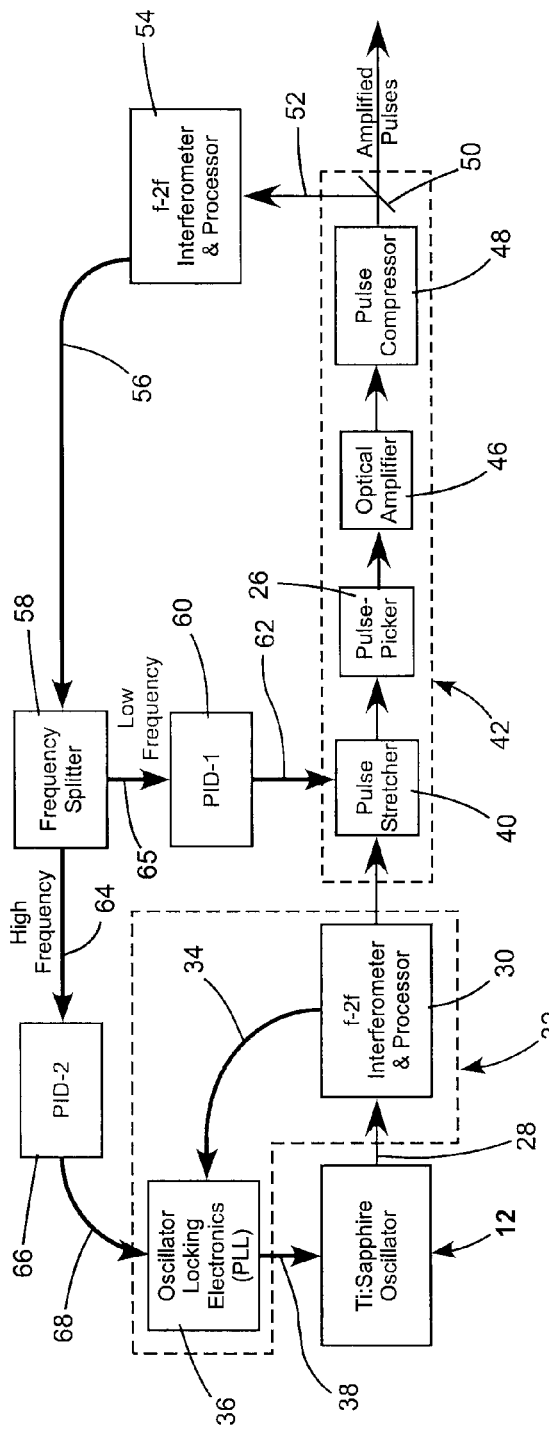
FIG. 2 schematically illustrates one preferred embodiment of apparatus in accordance with the present invention, including a CEP locked oscillator and delivering pulses to be amplified, a chirped pulse amplifier (CPA) including a pulse stretcher for temporally stretching pulses prior to amplification, an optical amplifier for amplifying the temporally stretched pulses, and a pulse compressor for temporally compressing the amplified stretched pulses, an interferometer for measuring the CEP of the compressed amplified pulses, frequency splitting means for splitting the CEP measurement into high frequency components and with the low frequency component being used to adjust the CEP of the amplifier by adjusting dispersion in the pulse-stretcher, and the high frequency component being used to adjust the CEP of the phase stabilized oscillator.
Figure 2A:
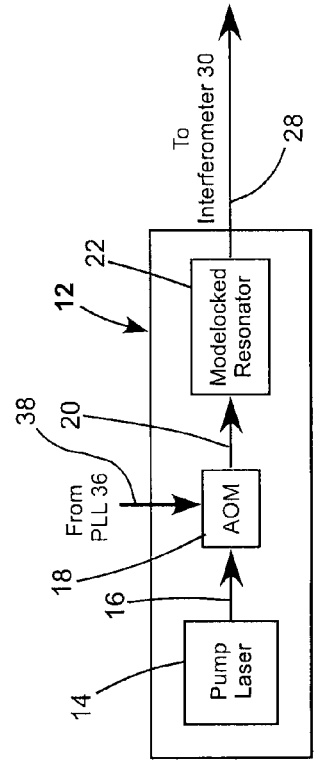
FIG. 2A schematically illustrates the details of the oscillator of FIG. 2.

Continuing with reference to the drawings wherein like features are designated by like reference numerals, FIG. 2 and FIG. 2A schematically illustrate one preferred embodiment 10 of ultrafast oscillator-amplifier apparatus in accordance with the present invention. In these drawings, and in other drawings referred to further herein below, electrical paths are depicted by bold lines and optical paths are depicted by fine lines.

Apparatus 10 includes an ultrafast laser oscillator 12, here, an oscillator including a titanium-doped sapphire (Ti:sapphire) gain-medium. Oscillator 12 (see FIG. 2A) includes a pump-laser 14 which delivers a beam 16 of pump-radiation. A modulator 18, such as an AOM, is provided for selectively modulating beam 16 to provide a modulated pump-beam 20. Beam 20 optically pumps a Ti:sapphire gain medium (not shown) in a modelocked laser-resonator (laser-cavity) 22. Resonator 22 delivers a sequence 28 of modelocked pulses at a pulse-repetition frequency on the order of tens of megahertz (MHz).

The CEP of pulses in beam 28 is locked to a predetermined offset frequency and phase (locking point) by a phase-locked loop 32 including an inline f-2f interferometer 30 and locking electronics (PLL electronics) 36. The offset frequency is an integer sub-multiple of the PRF of pulses in path 28. By way of example, an offset frequency of 0.25 provides that every fourth pulse in path is about identical with a previous or subsequent fourth pulse. Interferometer 30 provides a signal 34 representative of the instant CEP of pulses in path 28 to the locking electronics 36.

As is well known practitioners of the ultrafast art, in an f-2f interferometer the frequency spectrum of a pulse to be CEP-measured is spectrally broadened by a broadening device such as a structured fiber to in excess of one octave. For pulses having a center wavelength in the gain-bandwidth of common ultrafast gain-media the spectrum is broadened into a white light continuum. The spectrum is split into high and low frequency portions, the low frequency portion is frequency converted to a higher frequency by an optically nonlinear crystal. The high frequency and converted low frequency portions are temporally separated leaving a temporal overlap and a corresponding spectral overlap. The two portions are optically re-combined to provide a beat-frequency which is measured directly as an RF signal from which signal 34 is calculated. The locking electronics provides a control signal 38 representative of the difference between the instant CEP and the desired value and the signal is delivered to AOM 28, which adjusts the CEP of pulses in path 28 to the predetermined locking-point value by changing the pump power delivered to resonator 22. An AOM has a high frequency-response and is able to respond at the highest PRF contemplated for pulses in path 28.

One suitable oscillator for oscillator 12 is a model Micra-CEPS™ available from Coherent Inc., of Santa Clara, Calif. This oscillator is phase-locked, as described above) by an f-2f interferometer and associated locking electronics available as model XPS800 from Menlo Systems GmbH of Munich, Germany.

Continuing with reference to FIG. 2, the phase-locked pulses in path 28 are delivered to a chirped-pulse amplifier (CPA) system 42 including a pulse-stretcher 40, an optical amplifier 46, and a pulse-compressor 48. As the PRF of pulses delivered from oscillator 12 is too high for subsequent amplification of the pulses, a pulse picker or frequency divider 26 is provided, here between the pulse stretcher and the amplifier, for reducing the pulse-repetition frequency to a few kilohertz (KHz) along beam path 28. One optical amplifier suitable for use as CPA 42 is a Coherent Inc. model Legend-Elite™, in which amplifier 46 is a regenerative amplifier. Amplifier 46 is optically pumped by a Coherent Inc. model Evolution-30™ DPSS pump laser (not shown).

Amplified pulses from pulse compressor 48 are sampled by a beam-splitting mirror 50 and the sample 52 is sent to an f-2f interferometer and processor 54 for measuring the CEP of the amplified pulses. Interferometer 54 preferably has a detector arrangement fast enough to measure the CEP of each pulse which allows the collection of data on every laser pulse in the sequence thereof delivered from pulse compressor 48, thereby maximizing the CE phase-noise information detected in the frequency domain. In an example of interferometer 54 used for an experimental evaluation of the inventive apparatus, a single analog detector (a photo-diode) was used to measure the beat-frequency spectrum provided by the interferometer. The detector output was sampled at a maximum rate equal to the PRF of pulses from the CPA. This allowed (with appropriate synchronization) for the detection of every pulse, providing CE phase-noise information at frequencies in a frequency band between the maximum sampling rate of the spectrometer detector (for example, about 30 Hz) and the repetition rate of the laser system (for example about 10 kHz).

In apparatus 10, a CEP voltage-signal 56 from interferometer 54 is split into two portions by an electronic frequency splitter 58. A high frequency portion 64 includes frequencies between a predetermined splitting-frequency and a maximum frequency which is preferably the pulse-repetition frequency of the amplified pulses. A low frequency portion 64 includes frequencies between DC and the splitting frequency. The low frequency portion is received by processing electronics 60, preferably a PID-controller PID-1. PID-1 generates a control signal 62 representative of the difference between the instantly measured CEP and a desired CEP value of the amplified pulses. This signal is delivered to pulse-stretcher 40, which is configured such that the pulse stretching can be selectively varied by varying the dispersion provided by dispersive elements (such as gratings or prisms) in the pulse stretcher.

CEP-control by varying dispersion in a pulse stretcher is known in the art. As noted above, one approach to stabilizing output pulses from a chirped pulse amplification arrangement is disclosed in U.S. Publication No. 2010/0061411. Here, an error-signal representing a difference between the measured and desired value is used to vary the separation of a pair of gratings in the pulse stretcher or compressor in a CPA system to drive the measured value back to the desired value. A preferred approach involves using an error signal to vary the inclination of a grating in a pulse-stretcher or pulse-compressor for changing dispersion, and accordingly CEP. This approach is described in U.S. Pre-Grant Publication No. 20110019267, assigned to the assignee of the present invention, and the complete disclosure of which is hereby incorporated herein by reference.

The change in dispersion required for changing the CEP is very small compared with the dispersion required for pulse stretching. Accordingly, using either of the above-discussed methods, the pulse stretcher 40 functions as a low frequency CEP-controller, without compromising the pulse-stretching function necessary for the CPA amplification.

High frequency portion 64 from frequency splitter 58 is received by signal processing electronic 66 (PID-2). PID-2 generates a control signal 68 representative of the difference between the instantly measured CEP and a desired CEP value of the amplified pulses. This signal is delivered oscillator locking electronics 36 of phase-locked loop 32. The signal is added to signal 34 and causes the locking electronics to vary the locking point of the phase-locked loop to pre-compensate the phase-locked CEP, via the high-frequency CEP controller (AOM) 18, for countering high-frequency CEP changes introduced in CPA 42.

It should be noted here that while separation of CEP control signal 56 into high-frequency and low-frequency portions is described above as being accomplished by frequency-splitter 58, it is also possible to achieve the frequency-splitting by dividing signal 56 into two portions including all frequencies, and then provide frequency-filtering using separate electronic-filtering devices in or ahead of PID-1 and PID-2. This would allow overlap of the high-frequency and low-frequency ranges selected, should this prove advantageous, for example, to use the higher parts of the gain-bandwidth of each PID controller. In such an overlap condition, the high-frequency limit of the low-frequency range would be greater than the low-frequency limit of the high-frequency range.

Whatever frequency separation method is selected, the high frequency and low frequency ranges need not fill the entire range of frequencies up to the maximum frequency. Indeed, it may be useful to select some limited high-frequency range to match some known characteristic mechanical-resonance frequency of CPA 36. What is important is that the signal processing electronics (PIDs) be adjustable completely independent of each other, and not inter-dependent as in the above-discussed oscillator stabilizing method of Yu et al.

The inventive CEP-control method was evaluated in an example of apparatus 10 wherein phase-locked Ti:sapphire oscillator 12 and CPA 36 were as exemplified above. The variation of CEP in pulse stretcher 40 was according to the method described in above-referenced Pre-Grant Publication 20110019267. Oscillator output pulses had a FWHM-duration of about 20 femtoseconds (fs) at a PRF of 80 Megahertz (MHz). This duration was stretched to about 150 picoseconds (ps) in pulse-stretcher 40. Following the stretching, the PRF was reduced to 10 kHz by pulse picker 26. Following amplification, the stretched pulses were compressed to less than 40 fs duration in pulse-compressor 48. The compressed amplified pulses had an energy-per-pulse of about 0.5 millijoules (mJ). The low-frequency signal-portion delivered to PID-1 included frequencies between DC and 10 Hz. The high-frequency signal-portion delivered to PID-2 included frequencies between 10 Hz and 10 KHz. PID controllers suitable for use as PID-1 and PID-2 are available from Stanford Research Systems Inc., of Sunnyvale, Calif.

Figure 3:
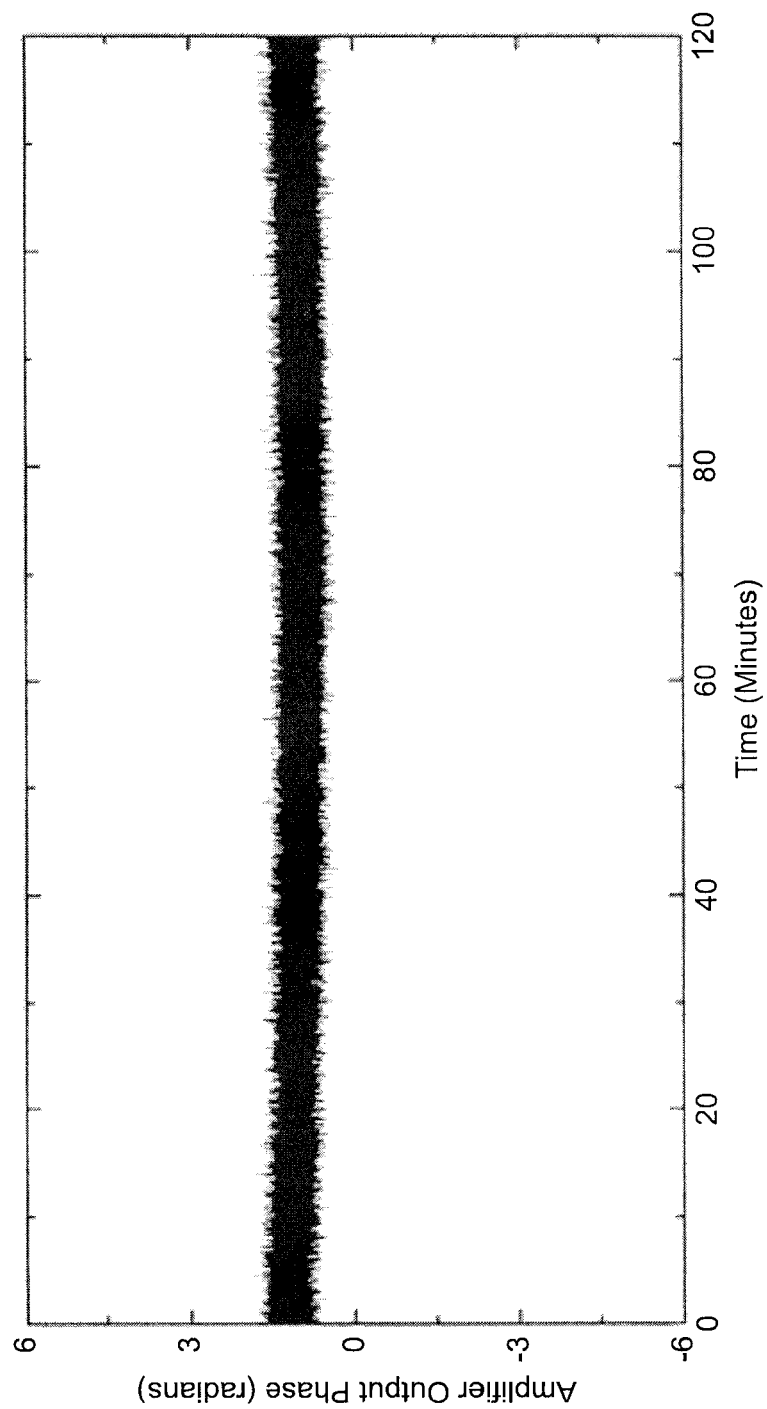
FIG. 3 is a graph schematically illustrating measured CEP of the compressed amplified pulses as a function of time in an experimental example of the apparatus of FIG. 2.

FIG. 3 is a graph schematically illustrating measured CEP of the compressed amplified pulses as a function of time in the above-described experimental example of the apparatus of FIG. 2. The CIP was measured over an operating period of 120 minutes. The RMS phase-variation of the CEP is about 200 milliradians (mrad). It can be seen from the graph that the peak-to-peak variation is about 1.3 radians. About 20% of the peak-to-peak variation is contributed by a very low-frequency drift over a period of about 60 minutes.

Figure 4:
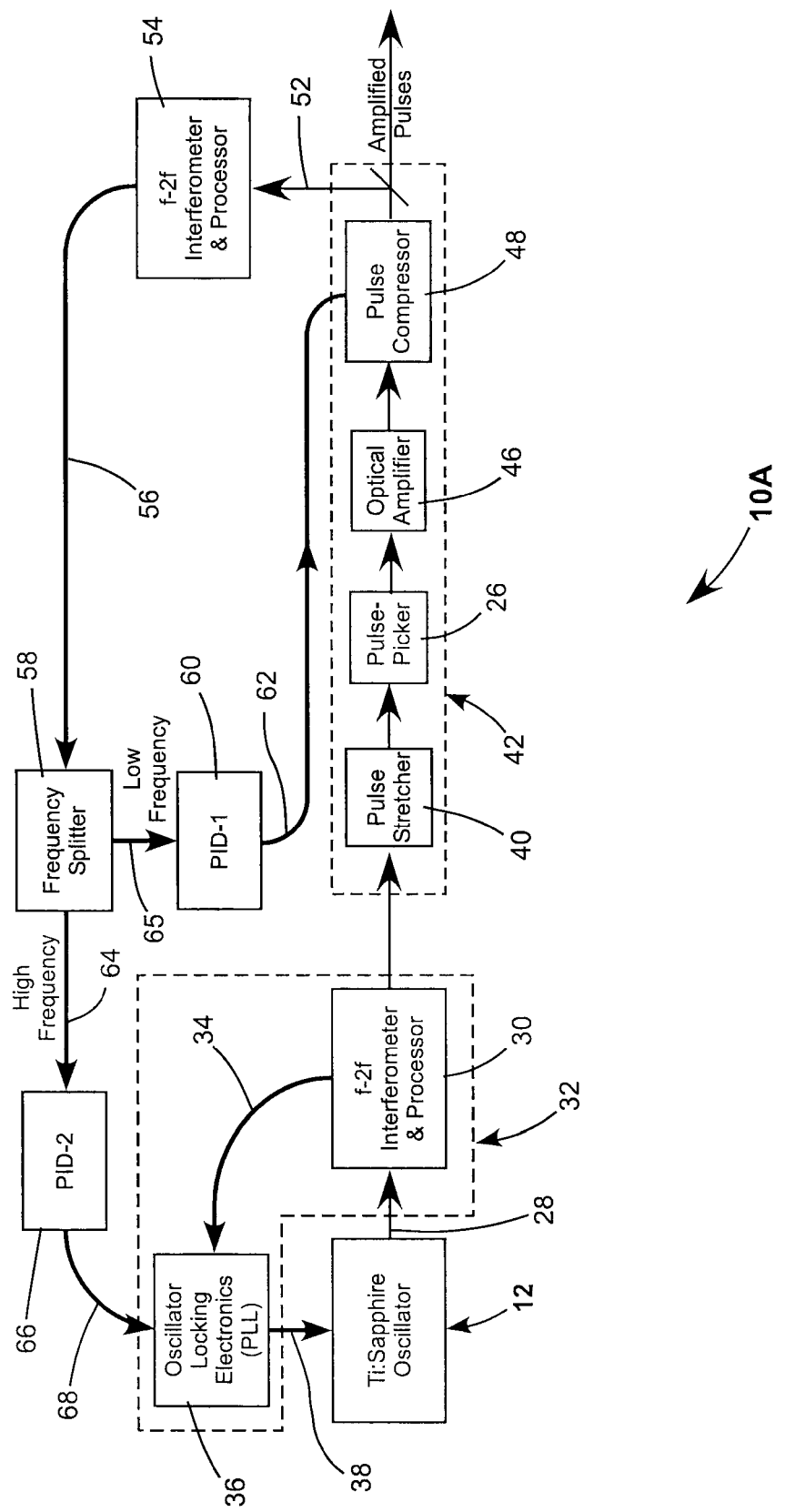
FIG. 4 schematically illustrates another preferred embodiment of apparatus in accordance with the present invention, similar to the apparatus of FIG. 2 but wherein the low frequency component of the CEP measurement is used to adjust the CEP of the amplifier by adjusting dispersion in the pulse-compressor.

FIG. 4 schematically illustrates another preferred embodiment of apparatus 10A in accordance with the present invention. Apparatus 10A is similar to the apparatus 10 of FIG. 2 with an exception that the pulse compressor rather than the pulse stretcher is used as a low-frequency CEP-controller. A preferred arrangement of the compressor is described in the above Pre-Grant Publication 20110019267.

Embodiments of the present invention are possible wherein CEP controllers not having a dual function are used. By way of example, the output of PID-2 could be used to drive an independent high-frequency-response CEP-controller in the path between interferometer 30 and pulse stretcher 40 in the arrangements of FIGS. 2 and 4. A independent low-frequency-response CEP-controller could be located anywhere in the CPA 42 of these arrangements. In an optical amplifier including multiple stages of amplification such a low-frequency-response CEP-controller could be located between amplifier stages. These and other modifications of the inventive apparatus may be made without departing from the sprit and scope of the present invention.

Devices suitable for use as independent fast-frequency-response CEP controllers include acousto-optical and electro-optical frequency/phase shifters (AOFS/AOPS/EOFS/EOPS), and acousto-optical programmable dispersive filters (AOPDF), for example Dazzler, available from FASTLITE, of Paris, France. Devices listed for fast-frequency-response can also be used as independent low-frequency-response actuators. A pair of glass counter-wedges, selectively translatable with respect to each other, may also be used as a low-frequency-response actuator.

Figures 5A, 5B, 5C:
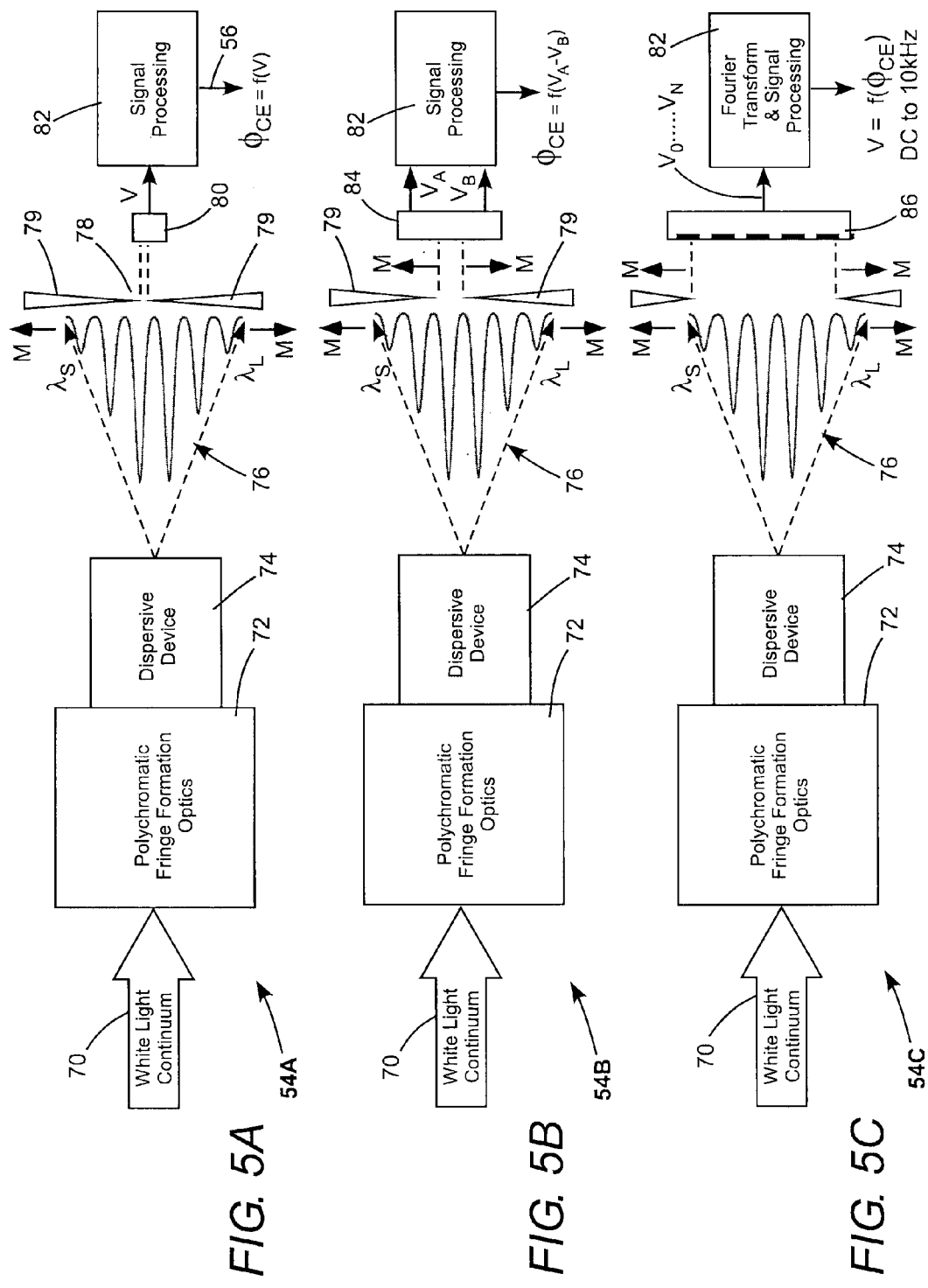
FIG. 5A schematically illustrates an arrangement of the CEP measuring interferometer in the apparatus of FIG. 2 including only a single detector element.
FIG. 5B schematically illustrates an arrangement of the CEP measuring interferometer in the apparatus of FIG. 2 including a multi-element position-sensitive detector.
FIG. 5C schematically illustrates an arrangement of the CEP measuring interferometer in the apparatus of FIG. 2 including only a CCD array detector.

In the experimental example of the inventive apparatus discussed above, interferometer 54 included only a single analog detector for examining the fringe spectrum produced in the interferometer. FIG. 5A schematically depicts this particular arrangement 54A of the interferometer in simplified form. A white light continuum 70, produced from a pulse to be measured is delivered to polychromatic-fringe forming optics 72 which function as described above. A dispersive device 74 including a grating or a prism (not shown) projects a fringed spectrum 76 of the fringe-pattern in optics 72.

The spectrum has a plurality of fringes at wavelengths in a range from a short wavelength $\lambda_S$ to a long wavelength $\lambda_L$. The spectrum is depicted here rotated from perpendicular to the plane of the drawing into the plane of the drawing, for convenience of illustration. In the experimental example, this range was from about 490 nm to about 570 nm. A slit arrangement 79 has an aperture 78 with a width less than the width of one fringe of the spectrum such that the single analog detector 80 sees less than the entire fringe, preferably an edge of the fringe. Pulse to pulse CEP variations cause motion of fringe spectrum 76 as indicated in the drawing by arrows M. This causes detector 80 to detect the CEP changes as simple variations of the detector output voltage V. Signal processing electronics 82 samples the detector voltage and generates a corresponding voltage (amplified or attenuated if necessary) to send a signal 56 for frequency splitting. This signal has frequency components from DC up to the maximum sampling frequency, here the PRF of the amplifier output, which is 10 kHz in the experimental example.

A shortcoming of the arrangement of FIG. 5 A is that detector 80 and the associated signal processing electronics 82 cannot differentiate between voltage variations due to the spectrum-motion M (phase noise) and amplitude noise. The robust phase locking demonstrated in FIG. 3 is all the more remarkable because of this. Decoupling phase-noise from amplitude noise could lead to improved stabilizing and would enable the amplifier output CEP to be locked to a selected CEP rather than following the locking point of the stabilized oscillator.

FIG. 5B schematically illustrates an arrangement 54B of interferometer 54 capable of providing some decoupling of phase-noise from amplitude-noise. Arrangement 54B is similar to arrangement 54A with an exception that single detector 80 of arrangement 54A is replaced in arrangement 55B by a multi-element-array position-sensitive detector 84. The aperture in slit arrangement 79 is made wide enough such that detector can "see" an entire fringe of spectrum 76. The fringe received by the detector will move over the detector corresponding to the spectral motion M.

The position sensitive detector generates voltages $V_A$ and $V_B$ which are sensitive to the position of the fringe-spot along the axis of the array. The difference between voltages $V_A$ and $V_B$ is proportional to the position on the detector and therefore the phase of the fringe. Accordingly this difference signal can be used directly (amplified or attenuated if necessary) as signal 56. Position sensitive detector 84 must have an operating bandwidth greater than the repetition rate of the amplifier output.

FIG. 5C schematically illustrates an arrangement 54C of interferometer 54 capable of providing essentially complete decoupling of phase-noise from amplitude noise. Arrangement 54C is similar to arrangement 54B with an exception that position sensitive detector 84 of arrangement 54B is replaced in arrangement 55C by a CCD array 56. The slit aperture is made wide enough such that most of the fringe spectrum 76 falls on the CCD array. The fringe spectrum will change position on the CCD array corresponding to the spectral motion M. The processing electronics 82 here samples a row of the CCD array at the PRF of the amplifier output. A phase voltage V is calculated from a fast Fourier Transform of the pixel voltages $V_0$ through $V_N$, where N is typically 255. A readout of the fringe amplitude as a function of wavelength can be extracted for diagnostic purposes. The entire sampling and calculation from acquisition of the CCD array sample through calculation the Fourier Transform, must happen at the PRF of the amplified laser pulses.

In summary, the present invention is described above with reference to a preferred and other embodiments. The invention is not limited, however, to the embodiments described and depicted. Rather, the invention is defined by the claims appended hereto.

What is claimed is:

1. Optical apparatus, comprising:
an oscillator arrangement including a laser cavity for generating modelocked optical pulses from which a sequence thereof, having a predetermined pulse-repetition frequency (PRF), is selected for amplification;
an optical amplifier arrangement for amplifying the sequence of optical pulses selected for amplification and delivering a corresponding sequence of amplified pulses;
an interferometer for periodically generating, at a maximum frequency less than or equal to the PRF of the sequence of optical pulses, a first signal representative of the instant carrier-envelope phase (CEP) of the pulses in the sequence of amplified pulses;
a frequency splitter for dividing the first signal into second and third signals, the second signal including frequency components in a first range between DC and a first frequency less than the maximum frequency, and the third signal including frequency components in a second range between a second frequency less than the maximum frequency and the maximum frequency;
a slow-response CEP-controller and a fast-response CEP-controller for adjusting the CEP of the pulses in the sequence of amplified pulses, each of the CEP controllers being located outside of the laser cavity of the oscillator arrangement;
a first signal-processing device arranged to receive the second signal, and a second-signal processing device arranged to receive the third signal, the first and second signal processing devices arranged to generate respectively first and second control signals each thereof representative of a difference between the instant and a desired CEP of the pulses in the sequence of amplified pulses, and
wherein the first and second control signals adjust respectively the slow-response and fast-response CEP-controllers to minimize the difference between the instant and the desired CEP of the pulses in the sequence of amplified pulses.

2. The apparatus of claim 1, wherein the first and second frequencies are about equal.

3. The apparatus of claim 1, wherein the first frequency is less than the second frequency.

4. The apparatus of claim 1, wherein first frequency is less than the second frequency.

5. The apparatus of claim 1, wherein the fast-response CEP-controller is arranged, responsive to the second signal to adjust the CEP of the modelocked pulses delivered by the laser cavity of the oscillator arrangement for adjusting the CEP of the amplified pulses.

6. The apparatus of claim 5 wherein the laser cavity of the oscillator arrangement is optically pumped by pump-beam delivered by a pump-laser and the fast-response CEP-controller is a selectively variable modulator for selectively modulating the pump-beam for varying the CEP of the modelocked pulses delivered by the laser cavity.

7. The apparatus of claim 5 wherein the slow-response CEP-controller is arranged, responsive to the first signal to adjust the CEP of pulses in the sequence thereof prior to amplification for adjusting the CEP of the amplified pulses.

8. The apparatus of claim 5 wherein the slow-response CEP-controller is arranged, responsive to the first signal to adjust the CEP of pulses in the sequence thereof following amplification for adjusting the CEP of the amplified pulses.

9. The apparatus of claim 1, wherein the laser cavity of the oscillator arrangement delivers the modelocked optical pulses at a PRF greater than the predetermined PRF of the pulses in the sequence thereof, and the oscillator arrangement includes a pulse-picker for selecting the sequence of optical pulses from the modelocked optical pulses.

10. The apparatus of claim 9, wherein the PRF of the modelocked pulses is about 80 Megahertz and the predetermined PRF of the sequence of pulses is 10 kilohertz.

11. The apparatus of claim 9, wherein the amplifier arrangement includes a pulse-stretcher for extending the duration of pulses to be amplified prior to amplification, an optical amplifier for providing the amplification, and a pulse-compressor for shortening the duration of the amplified pulses, and wherein the pulse picker is located between the pulse-stretcher and the optical amplifier.

12. The apparatus of claim 11, wherein the optical amplifier is a regenerative amplifier.

13. The apparatus of claim 11, wherein one of the pulse-stretcher and the pulse-compressor functions additionally as the slow-response CEP-controller.

14. The apparatus of claim 1, wherein the pulse-stretcher functions additionally as the slow-response CEP-controller.

15. The apparatus of claim 1, wherein the first-and signal processing devices include a PID controller.

16. Optical apparatus, comprising:
an oscillator arrangement including a laser cavity for generating modelocked optical pulses from which a sequence thereof, having a predetermined pulse-repetition frequency (PRF), is selected for amplification, the laser cavity being optically pumped by a pump-beam from a pump-laser with a selectively variable modulator located in the pump beam between the pump-laser and the laser cavity;

an chirped-pulse optical amplifier (CPA) arrangement for amplifying the sequence of optical pulses selected for amplification and delivering a corresponding sequence of amplified pulses, the CPA arrangement including a pulse-stretcher for stretching the duration of pulses prior to amplification, an optical amplifier for amplifying the stretched pulses, and a pulse-compressor for compressing the amplified stretched pulses;

an interferometer for periodically generating, at a maximum frequency less than or equal to the PRF of the sequence of optical pulses, a first signal representative of the instant carrier-envelope phase (CEP) of the pulses in the sequence of amplified pulses;

a frequency splitter for dividing the first signal into second and third signals, the second signal including frequency components in a first range between DC and a first frequency less than the maximum frequency, and the third signal including frequency components in a second range between a second frequency less than the maximum frequency and the maximum frequency;

a slow-response CEP-controller and a fast-response CEP-controller for adjusting the CEP of the pulses in the sequence of amplified pulses, each of the CEP controllers being located outside of the laser cavity of the oscillator arrangement, with one of the pulse-compressor and the pulse stretcher having selectively variable dispersion and functioning as the slow-response CEP-controller, and the selectively variable pump-beam modulator functioning as the fast-response CEP controller;

a first signal-processing device arranged to receive the second signal, and a second-signal processing device arranged to receive the third signal, the first and second signal processing devices arranged to generate respectively first and second control signals each thereof representative of a difference between the instant and a desired CEP of the pulses in the sequence of amplified pulses, and wherein the first and second control signals adjust respectively the slow-response and fast-response CEP-controllers to minimize the difference between the instant and the desired CEP of the pulses in the sequence of amplified pulses.

17. The apparatus of claim 16, wherein the sequence of pulses having the predetermined PRF is selected from the modelocked pulses delivered from the laser cavity by a pulse-picker located between the pulse compressor and the optical amplifier.

18. The apparatus of claim 16, wherein the optical amplifier is a regenerative amplifier.

* * * * *